May 11, 1954  J. B. GOODMAN  2,677,843
CLEANING DEVICE FOR TEETH
Filed Nov. 24, 1950
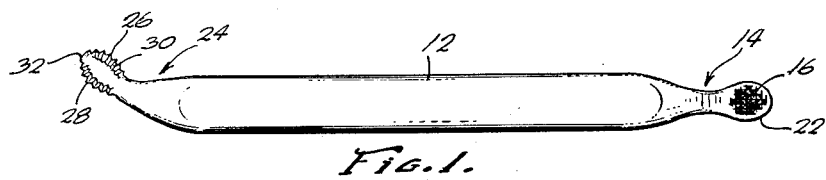
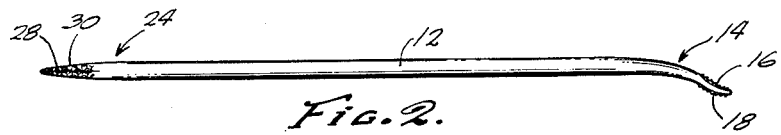
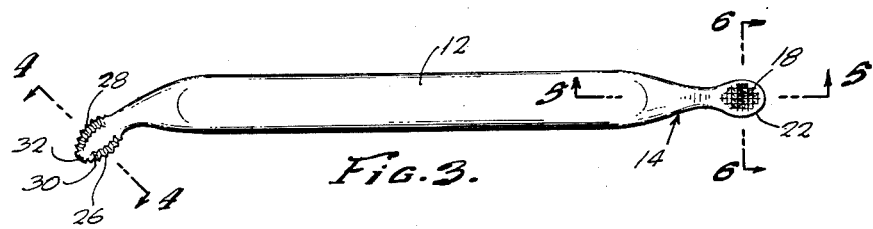
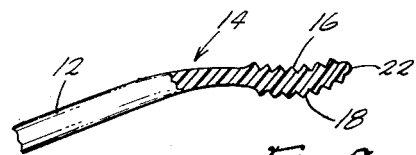
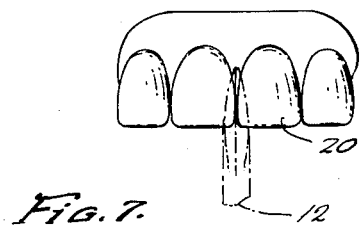
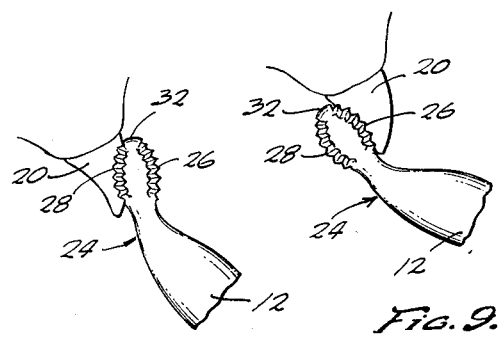
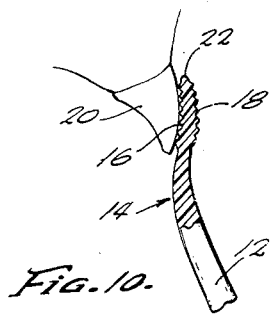
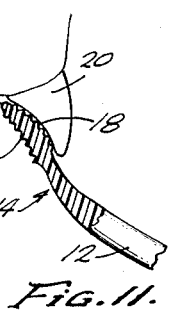
INVENTOR.
JACOB BARDIN GOODMAN
BY
*James and Franklin*
ATTORNEYS.

Patented May 11, 1954

2,677,843

UNITED STATES PATENT OFFICE 2,677,843

CLEANING DEVICE FOR TEETH

Jacob Bardin Goodman, Rockville Centre, N. Y.

Application November 24, 1950, Serial No. 197,473

7 Claims. (Cl. 15—236)

This invention relates to cleaning devices for teeth.

Current practice is to brush the teeth, but this is often ineffective for the removal of stain and tartar. A more thorough cleaning by a dentist is infrequent, say once in six months even with the best of dental care.

The primary object of the invention is to generally improve cleaning devices for teeth. A more particular object is to provide an implement or cleaning device for use in the home, which will be effective to remove stain and tartar, particularly on the anterior teeth where it is most visible and unsightly. For home use by laymen it is important to avoid hardened steel cutting implements such as are used in the more skilled and knowing hands of a dentist. I have found that by using ordinary molded plastics of the type suitable for inexpensive injection molding, and by providing serrations on the molded surface, an implement is made available which is hard enough to have an abrading effect which will remove stain and tartar, and yet is too soft to injure the teeth. Moreover, the fact that the implement may wear and dull after being used a number of times is no great disadvantage because of the very slight cost at which the device may be manufactured and sold.

In accordance with a further feature and object of the invention the entire device may be integrally molded in a single piece to provide one or more and preferably two working ends and a handle. The ends are preferably disposed at such angles relative to the handle as to make the device convenient to use, and the working surfaces at the ends may be shaped to conform somewhat to the tooth surfaces which are to be cleaned.

To accomplish the foregoing general objects, and other more specific objects which will hereinafter appear, my invention resides in the cleaning device elements and their relation one to another as are hereinafter more particularly described in the following specification. The specification is accompanied by a drawing in which:

Fig. 1 shows a cleaning device embodying features of my invention, the said device being viewed flatwise;

Fig. 2 illustrates the device viewed edgewise;

Fig. 3 shows the opposite side of the device viewed flatwise;

Fig. 4 is a transverse section drawn to enlarged scale and taken approximately in the plane of the line 4—4 of Fig. 3;

Fig. 5 is a longitudinal section drawn to enlarged scale and taken approximately in the plane of the line 5—5 of Fig. 3;

Fig. 6 is a transverse section drawn to enlarged scale and taken approximately in the plane of the line 6—6 of Fig. 3;

Fig. 7 is a front elevation of the anterior teeth showing one end of the cleaning device in use;

Figs. 8 and 9 are side elevations of an anterior tooth showing the cleaning device in operation; and Figs. 10 and 11 are side elevations of an anterior tooth showing the other end of the cleaning device in operation.

Referring to the drawing, and more particularly to Figs. 1, 2 and 3, the device is preferably a one-piece integrally molded implement comprising an elongated generally flattened handle portion 12 having one end 14 bent at an angle as viewed edgewise in Fig. 2. This end has transverse serrations 16 and 18 for rubbing against the labial (outer) and lingual (inner) sides of the anterior teeth, the device being held generally upright as indicated in Figs. 10 and 11. Thus the transverse serrations 16 are used on the labial side of the tooth 20, while the serrations 18 are used on the lingual side. The angle at which the end 14 is bent relative to the handle 12 makes it possible for the handle to be manipulated outside the mouth while the working end engages the tooth.

The working surfaces are preferably made concavo-convex to better fit the teeth. Thus referring to Fig. 5 the surface 16 is preferably made somewhat concave, and the surface 18 somewhat convex, about an axis extending transversely of the length of the implement, the concave surface 16 being on the outside, and the convex surface 18 being on the inside of the angle formed by the working end 14 and the handle 12. This concavo-convex relation helps conform to the labial and lingual surfaces of the incisors.

Reverting to Figs. 1, 3 and 6, it will be seen that the periphery 22 of the working end 14 is preferably rounded and smooth in order to minimize any possibility of injuring the gums. Moreover, by reference to Figs. 1 and 6 it will be seen that the surface 16 may be provided with longitudinal as well as transverse serrations, or in effect with a knurled surface. The longitudinal serrations may be used on the outer surface of the other teeth, that is, the bicuspids and molars, at which time the implement may be held generally horizontal rather than upright. The opposite surface 18 may also be knurled.

It may be explained that the serrating or knurling of the surface is important not only for direct abrading action, but also to retain and apply to the tooth surface a suitable cleaning agent in paste or powder form. This cleaning agent may include not only cleaning substances, but if desired a de-sensitizer or/and fluoride for additional treatment of the tooth surface.

The other end of the device is also preferably made into a working end, generally designated 24. This end 24 is preferably bent at an angle to the handle, but is bent in the plane of the handle, that is, with the device viewed flatwise, as in Figs. 1 and 3. The end 24 is straight or in alignment with the handle when viewed edgewise as in Fig. 2. The end 24 is given thin tapered edges 26 and 28. A series of closely spaced serrations 30 run transversely of the edges. They are formed in the side faces of the edges, as will be seen in Fig. 4, and are intended for rubbing against the interproximal surfaces of the anterior teeth.

This is best shown in Figs. 7, 8, and 9 in which it will be seen that the handle is held edgewise so that the edge 28 may be used in front of the teeth (Fig. 8) and the edge 26 in back of the teeth (Fig. 9). It will also be apparent from inspection of Figs. 8 and 9 how the angular relation of the end 24 to the handle 12 facilitates use of the device with the handle extending outside the mouth for convenient manipulation. Reverting to Figs. 1 and 3 it will be seen that the endmost portion 32 of the periphery is preferably left unserrated and smooth in order to minimize any chance of injury to the gums.

It is believed that the construction and method of use of my improved cleaning device, as well as the advantages thereof, will be apparent from the foregoing detailed description. It will also be apparent that while I have shown and described the device in a preferred form, changes may be made in the structure shown without departing from the scope of the invention as sought to be defined in the following claims. The claims sometimes refer to "flat surfaces" of the labial-lingual end 14, but it will be understood that this is merely intended to be in contradistinction to the interproximal end 24 which is employed edgewise, and the term "flat" is not intended to exclude the somewhat concavo-convex configuration described.

I claim:

1. A one-piece integrally molded tooth cleaning device for the removal of tartar and stain at home by personal hygiene, said device being molded in one piece out of a molding plastic which is so hard at room temperature that it may be used for the desired tartar scraping action, but which is soft enough compared to the steel instruments of a dentist as not to injure tooth enamel, and said device comprising an elongated handle portion having a relatively small thin flat working end, said end having its surface serrated with a series of small closely spaced serrations for rubbing against the tooth surface.

2. A one-piece integrally molded tooth cleaning device for the removal of tartar and stain at home by personal hygiene, said device being molded in one piece out of a molding plastic which is so hard at room temperature that it may be used for the desired tartar scraping action, but which is soft enough compared to the steel instruments of a dentist as not to injure tooth enamel, and said device comprising an elongated handle portion having one end bent at an angle, said end being a relatively small thin flat working end, and said end having a series of small closely spaced serrations for rubbing against the tooth surface.

3. A one-piece integrally molded tooth cleaning device for the removal of tartar and stain at home by personal hygiene, said device being molded in one piece out of a molding plastic which is so hard at room temperature that it may be used for the desired tartar scraping action, but which is soft enough compared to the steel instruments of a dentist as not to injure tooth enamel, and said device comprising an elongated handle portion having a relatively small thin flat working end with tapered edges, said edges having their surfaces serrated with a series of small closely spaced serrations for rubbing against the interproximal surfaces of the anterior teeth.

4. A one-piece integrally molded tooth cleaning device for the removal of tartar and stain at home by personal hygiene, said device being molded in one piece out of a molding plastic which is so hard at room temperature that it may be used for the desired tartar scraping action, but which is soft enough compared to the steel instruments of a dentist as not to injure tooth enamel, and said device comprising an elongated handle portion having one end bent at an angle as viewed flatwise, said end being a relatively small thin flat working end with tapered edges, and the surfaces at said edges having a series of small closely spaced serrations running transversely of the edges for rubbing against the interproximal surfaces of the anterior teeth.

5. A one-piece integrally molded tooth cleaning device for the removal of tartar and stain at home by personal hygiene, said device being molded in one piece out of a molding plastic which is so hard at room temperature that it may be used for the desired tartar scraping action, but which is soft enough compared to the steel instruments of a dentist as not to injure tooth enamel, and said device comprising an elongated handle portion having a relatively small thin flat working end, and said end having its flat surfaces serrated with a series of small closely spaced serrations for rubbing against the surfaces of the teeth.

6. A one-piece integrally molded tooth cleaning device for the removal of tartar and stain at home by personal hygiene, said device being molded in one piece out of a molding plastic which is so hard at room temperature that it may be used for the desired tartar scraping action, but which is soft enough compared to the steel instruments of a dentist as not to injure tooth enamel, and said device comprising an elongated handle portion having one end bent at an angle as viewed edgewise, said end being a relatively small thin flat working end and having its flat surfaces provided with a series of small closely spaced serrations for rubbing against the surfaces of the teeth.

7. A one-piece integrally molded tooth cleaning device for the removal of tartar and stain at home by personal hygiene, said device being molded in one piece out of a molding plastic which is so hard at room temperature that it may be used for the desired tartar scraping action, but which is soft enough compared to the steel instruments of a dentist as not to injure tooth enamel, and said device comprising an elongated handle portion having one end bent at an angle as viewed edgewise, said end being a relatively small thin flat working end and having its flat surfaces provided with a series of small closely spaced serrations for rubbing against the teeth, and said end being made concavo-convex about an axis transverse to the longitudinal axis of the device with the concave surface on the outside of the angle and with the convex surface on the inside of the angle in order to better fit the labial and lingual surfaces of the anterior teeth while holding the device generally upright.

References Cited in the file of this patent

UNITED STATES PATENTS

| Number | Name | Date |
|---|---|---|
| D. 23,752 | Ruedisale | Oct. 30, 1894 |
| 1,002,463 | Strangman | Sept. 5, 1911 |
| 1,258,208 | Gaillard | Mar. 5, 1918 |
| 1,872,939 | Haddican | Aug. 23, 1932 |
| 2,355,744 | Myers | Aug. 15, 1944 |
| 2,519,946 | Voelker et al. | Aug. 22, 1950 |
| 2,568,012 | Le Boeuf | Sept. 18, 1951 |

FOREIGN PATENTS

| Number | Country | Date |
|---|---|---|
| 573,391 | France | June 23, 1924 |

OTHER REFERENCES

Dental Cosmos of 1918, vol. LX., 61, pp. 889,890.